Patented Mar. 29, 1949

2,465,731

UNITED STATES PATENT OFFICE 2,465,731

ALLYL HALOGENO SILICANES AND PROCESSES OF PREPARING SAME

Edward L. Kropa, Old Greenwich, Conn., assignor to American Cyanamid Company, New York, N. Y., a corporation of Maine No Drawing. Application August 1, 1944, Serial No. 547,642

3 Claims. (Cl. 260—448.2)

This invention relates to allylchloro silicanes and processes of preparing same. The invention also relates to the fluorine analogs of the allylchloro silicanes and the production thereof.

The allylchloro silicanes may be prepared by reacting magnesium allyl bromide and silicon tetrachloride in anhydrous ethyl ether in accordance with the Barbier modification of the Grignard reaction, or the Grignard reagent may be prepared from the allyl bromide and magnesium and this reacted with the silicon tetrachloride in anhydrous ethyl ether. The fluorine analogs are made by substituting silicon tetrafluoride for silicon tetrachloride.

The following examples, in which the proportions are in parts by weight, are given by way of illustration and not limitation:

Example 1

| | Parts |
|---|---|
| Allyl bromide (1.5 mols) | 180 |
| Magnesium turnings (4 mols) | 96 |
| Silicon tetrachloride (0.6 mol) | 102 |
| Anhydrous ethyl ether | 920 |

212 parts of ethyl ether and the magnesium are placed in a suitable reaction vessel provided with an agitator. The allyl bromide is diluted with about 567 parts of the ether and the mixture is added to the magnesium and ether slowly, over a period of about 225 minutes. During the addition of the allyl bromide-ether mixture the reaction mixture is agitated and this agitation is continued for about one hour after the introduction of all of the allyl bromide-ether mixture. The Grignard reagent thus formed is decanted from the unreacted magnesium and added slowly to the silicon tetrachloride which is dissolved in about 141 parts of the ether and contained in a suitable reaction vessel provided with an agitator. The Grignard reagent is added over a period of about 2 hours and then the reaction mixture is allowed to stand for about one day. The solid material, which precipitates during this time, is filtered and washed thoroughly with ethyl ether. The filtrate and washings are combined and the ether is distilled off by heating the solution in a still by means of steam. The residue is then distilled under an absolute pressure of about 15 mm. of mercury. The following fractions are collected:

| Fraction | B. P., °C. | Refractive Index | Parts by Weight |
|---|---|---|---|
| 1 | 30–42 | 1.4509 | 18 |
| 2 | 45–58 | 1.4621 | 49.3 |
| 3 | 60–80 | 1.4725 | 5.7 |

Fractions 2 and 3 contain a high concentration of diallyldichloro silicane with small proportions of other allylchloro silicanes and possibly a small proportion of tetra-allyl silicane.

Example 2

| | Parts |
|---|---|
| Allyl bromide | 60.5 |
| Magnesium turnings | 24 |
| Silicon tetrachloride | 42.5 |
| Anhydrous ethyl ether | 265 |

The magnesium is covered with about 88 parts of the ether and the reaction initiated by the introduction of about 2 parts of the allyl bromide. The remainder of the allyl bromide is mixed with the silicon tetrachloride in about 177 parts of the ether and the resulting mixture is added slowly to the magnesium and ether over a period of about 3 hours. The reaction mixture is agitated during the addition of the silicon tetrachloride-ether mixture, during which time the reaction is vigorous. After standing over night, the reaction mixture is filtered to remove the solid which precipitates and the latter is washed thoroughly with ethyl ether. After filtration, the filtrate and washings are combined and the ethyl ether is distilled, leaving a residue which is distilled under an absolute pressure of 13 mm. of mercury. About 29.2 parts of diallyldichloro silicane, having a boiling point of 50–73° C. at 13 mm., are obtained.

Example 3

| | Parts |
|---|---|
| Magnesium turnings (3 mols) | 72 |
| Allyl bromide (1.5 mols) | 180 |
| Silicon tetrachloride (1.2 mols) | 204 |
| Anhydrous ethyl ether | 1000 |

A Grignard reagent is prepared from the magnesium turnings, allyl bromide, and about 820 parts of the ether. The Grignard reagent, after being prepared in the same manner as described in Example 1, is decanted from unreacted magnesium and then added slowly to the silicon tetrachloride dissolved in about 177 parts of the ether. The reaction mixture is agitated during the addition of the Grignard reagent, which takes place over a period of about 75 minutes. The monollyltrichloro silicane, which is prepared in accordance with this example, is recovered and purified in accordance with the procedure of Example 1. A yield of about 108.5 parts of the product, boiling at 34–60° C. at 14 mm. of mercury absolute, are obtained.

The triallylmonochloro silicane may be prepared by using a larger excess of the Grignard reagent as compared to the silicon tetrachloride than was used in Example 1, or the triallylmonochloro silicane, a small proportion of which is formed in Examples 1 and 2, may be obtained by fractionation of the final product. Each of the allylchloro silicanes is generally present in the reaction mixture and the relative proportions thereof are controlled by varying the relative proportions of the Grignard reagent as compared to the silicon tetrachloride. When larger proportions of the Grignard reagent, as compared to the silicon tetrachloride, are employed, more allyl groups will be introduced into the silicane molecule than when lower proportions of the Grignard reagent are employed. By adjusting the proportions to approximately those employed in Examples 1 and 2, a product is obtained which is essentially diallyldichloro silicane with minor proportions of the other allylchloro silicanes and tetra-allyl silicane, whereas, when higher proportions of the Grignard reagent are employed, a higher concentration of triallylmonochloro silicane is obtained and when lower concentrations of the Grignard reagent are employed, a higher concentration of the monoallyltrichloro silicane is obtained. While the mixed products, obtained in accordance with my invention, may be fractionated into the inidvdual substances, it is generally more economical and equally satisfactory to employ the mixtures which contain essentially the desired allylchloro silicane.

The production of the allylchloro silicanes, in accordance with my invention, may be carried out by means of the Grignard reaction or by means of the Barbier modification of the Grignard reaction. However, when the Barbier modification of the Grignard reaction is used, it has been found that the allyl bromide should be mixed with the silicon tetrachloride and this added to the magnesium in ether, since the reaction of the allyl bromide and magnesium does not proceed easily when a large excess of silicon tetrachloride is present.

The reaction may be carried out at temperatures ranging from 0° C. up to about 100° C., although the reaction proceeds satisfactorily at room temperatures and, therefore, such temperatures are generally preferable.

The allyl silicon halides may be readily hydrolized to give compounds of the class known as silicols. Thus, for example, the reaction of the allylchloro silicanes with water may be illustrated by the following equations:

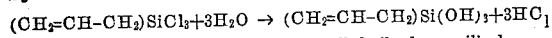
Allyltrihydroxy silicol

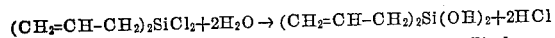
Diallyldihydroxy silicol

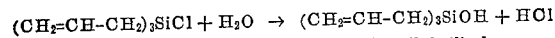
Triallyl silicol

The allyl silicols condense with the elimination of water to give mixtures of polymers or condensation products known as silicones. Such polymers from allyl silicols contain the repeating unit

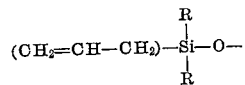

where the R groups may be allyl or O—. It is apparent that triallyl silicol would form a dimer by condensation but this dimer could be polymerized because of the unsaturated allyl groups, to form a high polymer or it could be copolymerized with other unsaturated material to form thermoplastic or infusible copolymers. The diallyldihydroxy silicol may be condensed to form a linear polymer, whereas the allyltrihydroxy silicol may be condensed to form a 3-dimensional polymer, which would be cross-linked. The silicones obtained from the allyltrihydroxy silicol, or the diallyldihydroxy silicol, may be polymerized by reaction of the double bonds to form highly branched, cross-linked polymers.

The following examples, in which the proportions are in parts by weight, illustrate the preparation of polymers from the allylchloro silicanes, produced in accordance with my invention:

*Example 4*

10 parts of the product obtained as Fraction 2 of Example 1 are diluted with about 22 parts of benzene and the solution is poured slowly into about 50 parts of water. Considerable heat develops and hydrogen chloride is liberated. The benzene layer is separated and washed thoroughly with water to remove any acid present. The benzene is volatilized by heating, leaving as a residue about 6.5 parts of a clear, colorless, viscous liquid. About 8.7 parts of toluene are added to the viscous liquid and the resulting solution is divided into two parts, A and B. To part A about 0.1 part of benzoyl peroxide is added. The solutions are now heated in an oven at about 100° C. in a suitable mold. After only 2 hours, part A is set while part B is still slightly fluid, although highly viscous. After 24 hours in the oven, part A and part B are both hard and somewhat brittle resins. Additional heating at about 135° C. increases the hardness and brittleness of the resins.

*Example 5*

About 11 parts of the product of Example 3 are dissolved in about 35 parts of toluene and the resulting solution poured slowly into about 50 parts of cold water. A small amount of insoluble solid forms and is filtered from the liquid. The toluene layer of the filtrate is separated and washed with water to remove acid, and is then heated to volatilize the toluene, leaving a clear, viscous solution. About 0.1 part of benzoyl peroxide is added to the solution which is placed in a suitable casting and heated at about 100° C. for 24 hours. The resulting casting is hard and clear and burns more slowly than the polymers obtained in accordance with Example 4.

*Example 6*

About 12.5 parts of the product of Example 3 is hydrolized and washed free of acid in the same manner as described in Example 5. The solution is diluted with toluene so that the concentration of the silicol is about 2% by weight. Glass plates are dipped into this solution, then heated at about 100° C. for 20 hours. The resulting films are thin, hard and transparent and adhere very tenaciously to the glass. The films are extremely hydrophobic, as shown by the fact that meniscus formation is prevented when cylindrical glass vessels are coated with the solution prepared in accordance with this example.

*Example 7*

A 20% solution of an allyl silicol prepared in the same general manner as that described in Example 6, and containing a small proportion of benzoyl peroxide, is concentrated to about 80–90% solids by heating with steam. This is applied as a coating to a sheet of a copolymer of styrene and an unsaturated alkyd resin. The coated sheet is then heated at about 100° C. for 17 hours during which time the silicone coating increases in hardness and a product is obtained having a surface somewhat harder than the surface of the copolymer, which has not been coated.

The condensation or polymerization of the allyl silicols prepared from the allylchloro silicanes may be effected by heating to temperatures between about 50° C. up to about 200° C. or higher if desired. It is preferable that the condensation temperature be at least 100° C.

It is preferable that the polymerization of the allylchloro silicanes, or the corresponding silicols, and silicones, be carried out in the presence of a polymerization catalyst, including the organic superoxides, aldehydic and acidic peroxides. Among the preferred catalysts there are the acidic peroxides, e. g. phthalic peroxide, succinic peroxide, and benzoyl acetic peroxides; fatty oil acid peroxides, e. g. coconut oil acid peroxides, lauric peroxide, stearic peroxide, oleic peroxide; alcohol peroxides, e. g. tertiary butyl hydroperoxide, usually called tertiary butyl peroxide; and terpene oxides, e. g. ascaridole. In some instances other types of polymerization catalysts might be used such as soluble cobalt salts (particularly the linoleate and naphthenate) p-toluene sulphonic acid, aluminum chloride, stannic chloride, and boron trifluoride, although any of the organic peroxides, such as for example, those mentioned above, are preferred.

The allylchloro silicanes may be polymerized in organic solvents, such as toluene, benzene, etc. Similarly, the allyl silicols may be polymerized in organic solvents or alone, as desired.

The allylchloro silicanes or the allyl silicols and silicones may be copolymerized with unsaturated alkyd resins, as described in my co-pending application, Serial No. 540,142, filed June 13, 1944, now U. S. Patent No. 2,443,740, of which the present application is a continuation-in-part.

The allylchloro silicanes, or the corresponding allyl silicols and silicones, may be copolymerized with vinyl compounds such as styrene, vinyl acetate, the allyl esters (e. g. diallyl phthalate, diallyl fumarate, diallyl maleate, diallyl sebacate, diallyl adipate), substituted styrenes such as p-methyl styrene, any of the dichlorostyrenes, any of the dimethylstyrenes, any of the esters of acrylic or methacrylic acid (e. g. methyl acrylate, ethyl acrylate, butyl acrylate, methyl methacrylate, ethyl methacrylate, etc.), acrylonitrile, methacrylonitrile, acrolein, methacrolein, etc. Other unsaturated substances which may be copolymerized with the allylchlor silicanes or the corresponding silicols and silicones, are the polyesters of the $\alpha,\beta$, unsaturated dicarboxylic acids, e. g. dimethyl maleate, diethyl fumarate, dibutyl fumarate, diethyl itaconate, etc.

Polymers of the allylchloro silicane, or silicols or silicones corresponding thereto, are useful in coating compositions, castings, moldings, as adhesives, and in laminating. Various organic or inorganic fillers may be included in molding compositions such as alpha cellulose pulp, wood flour, asbestos, glass and mica; whereas, in laminating the polymer may be employed to bind together fabrics or paper compositions of cellulosic fibers, asbestos, glass, polyamides ("nylon"), etc.

Since the polymers and copolymers of allyl silicane and the corresponding silicols and silicones adhere to glass very tenaciously, they are particularly useful for glass coating compositions or as adhesives for glass.

While the invention has been described particularly with reference to the allylchloro silicanes, it is to be understood that the allyl fluoro silicanes may be prepared and used in the same general manner.

Obviously, many modifications and variations may be made in the process and products described herein without departing from the scope of the invention, as described in the appended claims.

I claim:

1. A process of producing allyl chloro silicanes which comprises heating silicon tetrachloride with allyl magnesium bromide in the presence of an anhydrous ethyl ether, the molal ratio of the allyl magnesium bromide to the silicon tetrachloride being between 1.25:1 and 2.5:1, and thereafter separating the allyl chloro silicanes from the product by distillation.

2. A process of producing a substance from the group consisting of allyl chloro silicanes and allyl fluoro silicanes which comprises heating a halogenated substance from the group consisting of silicon tetrachloride and silicon tetrafluoride with allyl magnesium bromide in the presence of anhydrous ethyl ether, the molal ratio of the allyl magnesium bromide to said halogenated substance being between 1.25:1 and 2.5:1, and thereafter separating the allyl halo silicanes thus obtained from the product by distillation.

3. A process of producing allyl chloro silicanes which comprises heating silicon tetrachloride with allyl bromide in the presence of magnesium and anhydrous ethyl ether, the molal ratio of the allyl bromide to the silicon tetrachloride being between 1.25:1 and 2.5:1, and thereafter separating the allyl chloro silicanes from the product by distillation.

EDWARD L. KROPA.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,377,689 | Hyde | June 5, 1945 |
| 2,386,793 | Hanford | Oct. 16, 1945 |
| 2,389,802 | McGregor | Nov. 27, 1945 |
| 2,397,727 | Daudt | Apr. 2, 1946 |
| 2,398,187 | McGregor | Apr. 9, 1946 |